Sept. 18, 1951   J. K. NORTHROP   2,568,021
HIGH LIFT FLAP
Filed Aug. 18, 1947
Fig.1
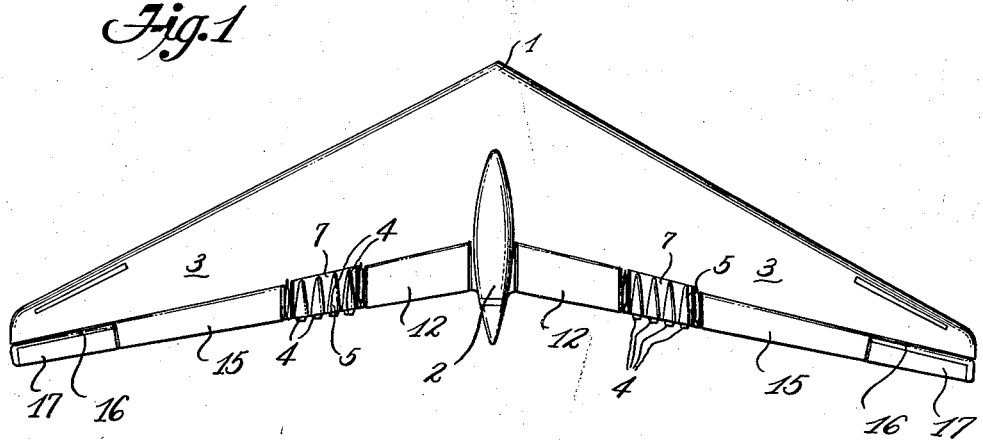
Fig.2
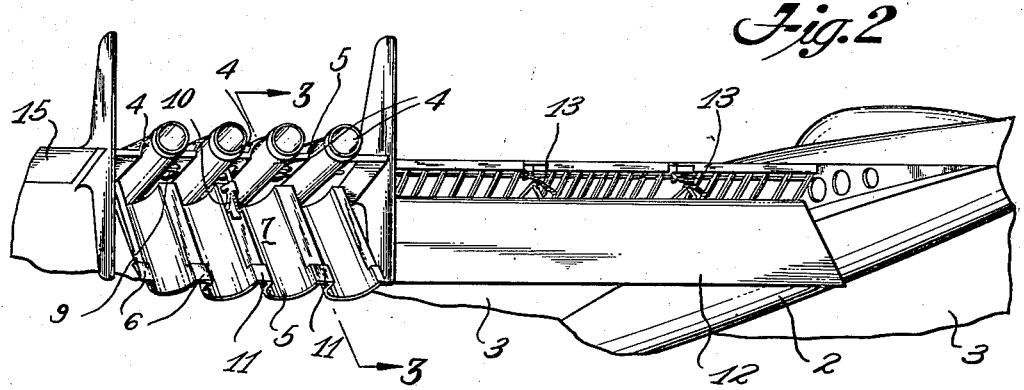
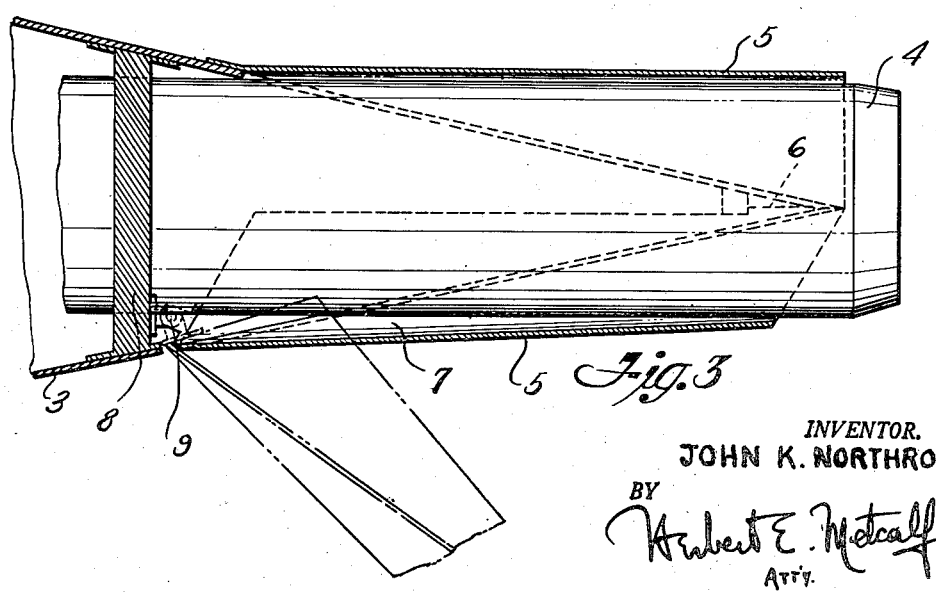
Fig.3
INVENTOR.
JOHN K. NORTHROP
BY
Herbert E. Metcalf
ATTY.

Patented Sept. 18, 1951

2,568,021

UNITED STATES PATENT OFFICE 2,568,021

HIGH LIFT FLAP

John K. Northrop, Los Angeles, Calif., assignor to Northrop Aircraft, Inc., Hawthorne, Calif., a corporation of California Application August 18, 1947, Serial No. 769,305

6 Claims. (Cl. 244—42)

The present invention relates to high lift flaps for airplanes and more particularly to high lift flaps suitable for airplanes having jet engines housed in the wing panels.

In high speed airplanes and particularly such airplanes as are jet driven, it is imperative that the high lift flap area be as large as possible, not only for the provision of extra lift for landing and takeoff but for the provision of drag after landing, to slow down the airplane. However, when jet engines are placed in the wing panels of such airplanes, the tail pipes, being much larger than the wing thickness at or near the trailing edge, necessitate the distortion of the upper or lower wing surface contours, usually both. Aerodynamically, it is more advisable to distort the lower surface only—or both surfaces—rather than to place the entire distortion in the upper surface. Consequently, the lower surfaces of the wing panels are usually distorted by tail pipe fairings, and if several jet engines are used, the tail pipes with their fairings occupy a substantial portion of the trailing edges of the wing panels that might otherwise be used for the installation of high lift flaps.

In accordance with the present invention, it has been found that, irrespective of the fact that the lower wing surface contour has been very substantially distorted by the tail pipe fairing, or fairings, in case multiple jets are installed side by side, the distorted portions of the lower wing surface, together with an undistorted portion on either side of a fairing can be swung downwardly in the same manner as the usual lift flap, and that the increased lift and drag obtained is substantially the same as if the moved portion were of undistorted contour throughout. Thus, no portion of the trailing edge is wasted due to jet installation, and maximum landing flap area is realized.

Accordingly, an object of the invention is to provide maximum high lift area in jet driven airplanes having lower wing surfaces distorted due to tail pipe installation.

Other advantages and objects of the present invention may be more readily understood by reference to the drawings, in which:

Figure 1 is a bottom plan view of an all-wing airplane embodying one preferred form of the present invention.

Figure 2 is a partial view in perspective from the lower rear of the airplane of Figure 1 showing the high lift flaps lowered.

Figure 3 is a sectional view taken as indicated by the line 3—3 in Figure 2.

Referring first to Figure 1, the airplane 1 has a central nacelle 2 and swept-back wing panels 3. The airplane, a United States Army bomber designated as YB-49, is driven by four jet engines placed within each wing panel, the hot gases of the jets emerging through tail pipes 4 just beyond the trailing edge of the wing panel. As the tail pipes are of relatively large diameter, about 2 feet, for example, for the General Electric Company's turbo-jet engine TG180, and as they in this instance pass through the trailing edge both above and below thereof, both upper and lower wing surface contours are distorted by the relatively large necessary wing surface fairings 5. These fairings are preferably so spaced as to provide a small undistorted portion 6 of the lower wing surface on either side of the distorted portion. Thus, a section 7 can be formed on the lower wing surface, including the fairings, that can be hinged to the preceding portion of the wing surface on the main beam 8 (see Figure 3) so that it can be swung downwardly on axle 9, preferably positioned just ahead of fairings 5 as by a pilot controlled power operated screw jack 10, as shown in Figure 2. In this case a small portion 11 of the upper wing surface contour is also included in the section 7, but this is optional, and due to the particular airplane design.

As pointed out above, maximum use of the trailing edge for flaps or other controls is highly desirable. Thus, the portion 12 of the upper and lower wing panel surfaces lying between the tail pipes and the nacelle is also hinged to be swung downwardly simultaneously with the fairing section 7 by screw jacks 13, thus providing a composite high lift flap extending along the trailing edge of each wing panel from the central nacelle to a point just beyond the outer tail pipe of each jet engine group.

The remainder of the controls of the airplane are similar to those described and claimed, for example, in United States Patent No. 2,412,647, issued to John K. Northrop, et al, December 17, 1946, and comprise elevons 15 which can be moved independently or simultaneously for lateral and vertical control, respectively; trim control flaps 16 for trimming the airplane; and separable drag rudders 17 mounted on the trim flaps for directional control or additional air braking.

In operation, the distorted section 7 and the undistorted section 12 are moved simultaneously downwardly to the proper angle for the desired lift on takeoff and landing, and then moved to a still greater angle for increased drag after landing, all in customary fashion. In flight the sections are closed to provide best free flight conditions. By thus utilizing the lower wing panel surfaces beneath the jet engine tailpipes a long and effective high lift flap span is obtained, and the tailpipes are completely faired in flight.

While the present invention has been described as applied to a particular airplane design, it will be clear to those skilled in the art that the present invention can be applied to any airplane where the lower wing surface is highly distorted adjacent the trailing edge thereof due to any cause, such as, for example, streamlined fairings or exhaust ducts for conventional reciprocating engines.

What is claimed is:

1. In a jet driven airplane, a wing panel having spaced upper and lower lift producing surfaces converging to a trailing edge, extending laterally from each side of the center line of said airplane, a plurality of adjacent parallel and cylindrical jet ducts emerging at the trailing edge of each wing panel with at least a portion of each of said ducts extending below the trailing edges of said wing panels, said duct portions extending forward to enter said wing panels, a landing flap hinged at the lower surface of each of said wing panels along a line forward of the entrance of said pipes in said wing panel, said flap extending aft to the trailing edge of said wing panel, said flap having separate fairings around each individual jet pipe, the portions of said flap between said fairings having normal wing panel lower surface contour, and means for rotating said flaps downwardly around the hinge line thereof to provide additional lift.

2. Apparatus in accordance with claim 1 wherein each of said wing panels has a portion of the lower wing surface laterally spaced from said flap hinged to rotate substantially coaxially with said flap and extending to the trailing edge of said wing panel, said latter portion being entirely of normal wing panel lower surface contour, and means to rotate said latter portion around its hinge line simultaneously with rotation of said flap.

3. In an airplane having a lifting wing, a high lift flap comprising a portion of the lower surface of said wing extending forwardly from the trailing edge of said wing, said flap being hinged to said wing to rotate downwardly and forwardly, the lower surface of said flap being contoured with a plurality of spaced parallel fairings of circular contour merging from a substantial arc of a circle at the trailing edge of said wing and extending forwardly with diminishing arcs to merge into the normal contour of said wing before reaching the hinge line of said flap, and means for rotating said flap downwardly to provide increased lift.

4. Apparatus in accordance with claim 1 wherein said flap includes a major area of said separate fairings and a minor area of normal wing panel lower surface contour.

5. In a jet driven airplane, a wing having spaced upper and lower lift producing surfaces converging to a trailing edge extending laterally from the center line of said airplane, a cylindrical jet pipe emerging from said wing at the trailing edge thereof with a substantial portion of the periphery of said pipe projecting below said lower surface at the trailing edge thereof and extending forwardly to enter said wing, a landing flap hinged at said lower surface forward of the entrance of said jet pipe into said wing, said flap extending aft to the trailing edge of said wing on each side of the projecting periphery of said jet pipe with normal lower wing surface contour, said flap being faired downwardly around the projecting periphery of said jet pipe to form a unitary flap having lateral areas of normal lower wing surface contour spaced by the downwardly faired portion, and means for rotating said unitary flap downwardly around the hinge line thereof to provide additional lift for said wing.

6. In a jet driven airplane, a wing having spaced upper and lower lift producing surfaces converging to a trailing edge extending laterally from the center line of said airplane, a cylindrical jet pipe emerging from said wing at the trailing edge thereof with a substantial portion of the periphery of said pipe projecting below said lower surface at the trailing edge thereof and extending forwardly to enter said wing, a landing flap hinged at said lower surface forward of and substantially parallel to said trailing edge and extending aft to the trailing edge of said wing on each side of the projecting periphery of said jet pipe with normal lower wing surface contour, said flap being faired downwardly around the projecting periphery of said jet pipe between said hinge line and said trailing edge to form a unitary flap having lateral areas of normal lower wing surface contour spaced by the downwardly faired portion, and means for rotating said unitary flap downwardly around the hinge line thereof of provide additional lift for said wing.

JOHN K. NORTHROP.

REFERENCES CITED

The following references are of record in the file of this patent:

UNITED STATES PATENTS

| Number | Name | Date |
| --- | --- | --- |
| 1,504,663 | Wright et al. | Aug. 12, 1924 |

FOREIGN PATENTS

| Number | Country | Date |
| --- | --- | --- |
| 518,065 | Great Britain | Feb. 16, 1940 |

OTHER REFERENCES

"Flight," December 19, 1946, pages 675–677.